(12) United States Patent
Sheng et al.

(10) Patent No.: US 11,048,998 B2
(45) Date of Patent: Jun. 29, 2021

(54) BIG DATA PROCESSING METHOD BASED ON DEEP LEARNING MODEL SATISFYING K-DEGREE SPARSE CONSTRAINT

(71) Applicants: INSTITUTE OF ACOUSTICS, CHINESE ACADEMY OF SCIENCES, Beijing (CN); SHANGHAI 3NTV NETWORK TECHNOLOGY CO. LTD., Shanghai (CN)

(72) Inventors: Yiqiang Sheng, Beijing (CN); Jinlin Wang, Beijing (CN); Haojiang Deng, Beijing (CN); Jiali You, Beijing (CN)

(73) Assignees: INSTITUTE OF ACOUSTICS, CHINESE ACADEMY OF SCIENCES, Beijing (CN); SHANGHAI 3NTV NETWORK TECHNOLOGY CO. LTD., Shanghai (CN)

(*) Notice: Subject to any disclaimer, the term of this patent is extended or adjusted under 35 U.S.C. 154(b) by 962 days.

(21) Appl. No.: 15/557,469

(22) PCT Filed: Mar. 31, 2015

(86) PCT No.: PCT/CN2015/075473
§ 371 (c)(1),
(2) Date: Sep. 11, 2017

(87) PCT Pub. No.: WO2016/145676
PCT Pub. Date: Sep. 22, 2016

(65) Prior Publication Data
US 2018/0068216 A1 Mar. 8, 2018

(30) Foreign Application Priority Data

Mar. 13, 2015 (CN) .......................... 201510112645.9

(51) Int. Cl.
*G06N 3/04* (2006.01)
*G06N 3/08* (2006.01)

(52) U.S. Cl.
CPC ......... *G06N 3/0472* (2013.01); *G06N 3/0454* (2013.01); *G06N 3/08* (2013.01); *G06N 3/082* (2013.01)

(58) Field of Classification Search
None
See application file for complete search history.

(56) References Cited

FOREIGN PATENT DOCUMENTS

| CN | 103489033 A | 1/2014 |
|---|---|---|
| CN | 103530689 A | 1/2014 |
| CN | 103838836 A | 6/2014 |

OTHER PUBLICATIONS

Han et al., "Learning both Weights and Connections for Efficient Neural Networks", Oct. 2015, arXiv, all pages (Year: 2015).*

* cited by examiner

*Primary Examiner* — Daniel C Puentes
(74) *Attorney, Agent, or Firm* — Bayramoglu Law Offices LLC

(57) ABSTRACT

A big data processing method based on a deep learning model satisfying K-degree sparse constraints comprises: step 1), constructing a deep learning model satisfying K-degree sparse constraints using an un-marked training sample via a gradient pruning method, wherein the K-degree sparse constraints comprise a node K-degree sparse constraint and a level K-degree sparse constraint; step 2), inputting an updated training sample into the deep learning model satisfying the K-degree sparse constraints, and optimizing a weight parameter of each layer of the model, so as to obtain an optimized deep learning model satisfying the K-degree sparse constraint; and step 3), inputting big data to be processed into the optimized deep learning model satisfying (Continued)

the K-degree sparse constraints for processing, and finally outputting a processing result. The method in the present invention can reduce the difficulty of big data processing and increase the speed of big data processing.

5 Claims, 2 Drawing Sheets

BIG DATA PROCESSING METHOD BASED ON DEEP LEARNING MODEL SATISFYING K-DEGREE SPARSE CONSTRAINT

CROSS REFERENCE TO RELATED APPLICATIONS

This application is the national phase of International Application No. PCT/CN2015/075473, filed on Mar. 31, 2015, which is based upon and claims priority to Chinese Patent Application No. 201510112645.9, filed on Mar. 13, 2015, the entire contents of which are incorporated herein by reference.

TECHNICAL FIELD

The present invention relates to the field of artificial intelligence and big data, and in particular, to a big data processing method based on a deep learning model satisfying the K-degree sparse constraint.

BACKGROUND OF THE INVENTION

With the rapid development of network technologies, data volume and data diversity increase rapidly, but it is difficult to improve the complexity of the algorithms for data processing, thus how to effectively processing big data has become an urgent problem. The existing methods for data description, data labelling, feature selection, feature extraction and data processing depending on personal experiences and manual operation can hardly meet the requirements of the fast growth of big data. The rapid development of artificial intelligence technologies, especially the breakthrough of the investigation on deep learning algorithms, indicates a direction worth exploring of solving the problem of big data processing.

Hinton, et al, proposed a layer-by-layer initialization training method for a deep belief network in 2006. This is a starting point of the investigation on deep learning methods, which breaks the situation of difficult and inefficient deep neural network training that lasts decades of years. Thereafter, deep learning algorithms take the place of traditional algorithms and are widely used in the fields of image recognition, speech recognition and natural language understanding, etc. By simulating the hierarchical abstraction of human brains, deep learning can obtain a more abstract feature via mapping bottom data layer by layer. Because it can automatically abstract a feature from big data and obtain a good processing effect via massive sample training, deep learning gets wide attention. In fact, the rapid growth of big data and the breakthrough of investigation on deep learning supplement and promote each other. On one hand, the rapid growth of big data requires a method for effectively processing massive data; on the other hand, the training of a deep learning model needs massive sample data. In short, by big data, the performance of deep learning can reach perfection.

However, the existing deep learning model still has many serious problems, for example, difficult model extension, difficult parameter optimization, too long training time and low reasoning efficiency, etc. A review paper of Bengio, 2013 summarizes the challenges and difficulties faced by the current deep learning, which includes: how to expand the scale of an existing deep learning model and apply the existing deep learning model to a larger data set; how to reduce the difficulties in parameter optimization; how to avoid costly reasoning and sampling; and how to resolve variation factors, etc.

SUMMARY OF THE INVENTION

It is an object of the present invention to overcome the above problems of an existing neural network deep learning model in the application of big data and propose a deep learning model satisfying the K-degree sparse constraint; by constraining the forward out-degree of the neuron nodes on each layer, the structure of the model can be simplified, the training speed and the generalization ability of the model can be improved, and the difficulties in parameter optimization of the model can be alleviated, and when the model is applied to big data processing, the difficulty of big data processing can be reduced, and the speed of big data processing can be increased.

In order to attain the above objects, the present invention proposes a big data processing method based on a deep learning model satisfying the K-degree sparse constraint, the method comprises:

step 1) constructing a deep learning model satisfying the K-degree sparse constraint using an unmarked training sample via a gradient pruning method, wherein the K-degree sparse constraint comprises a node K-degree sparse constraint and a level K-degree sparse constraint, the node K-degree sparse constraint refers to that forward out-degrees of all the nodes in the model do not exceed K, and a value taking range of K is (1,N/H], wherein N is the number of all the nodes in the deep learning model, H is the number of hidden layers of the model, and the level K-degree sparse constraint refers to that a sum of forward out-degrees of all the nodes in an $h^{th}$ layer is less than a sum of forward out-degrees of all the nodes in an $(h-1)^{th}$ layer;

step 2) inputting an updated training sample into the deep learning model satisfying the K-degree sparse constraint, and optimizing a weight parameter of each layer of the model, so as to obtain an optimized deep learning model satisfying the K-degree sparse constraint; and step 3) inputting big data to be processed into the optimized deep learning model satisfying the K-degree sparse constraint for processing, and finally outputting a processing result.

In the above technical solution, a value of K is:

$$K = \left\lfloor \frac{\sqrt{d_{in} d_{out}}}{H} \right\rfloor$$

wherein, $d_{in}$ is a dimensionality of an input of the model, $d_{out}$ is a dimensionality of an output of the model, H is the number of hidden layers of the model, and $\lfloor \ \rfloor$ is a rounding symbol.

In the above technical solutions, the step 1) in the method further comprises:

step 101) numbering each layer of the deep learning model according to an order from an input layer to an output layer, where it is set that h=−1;

it is set that the deep learning model comprises an input layer, H hidden layers and an output layer, i.e., totally H+2 layers from the input layer to the output layer, and it is set that the input layer is numbered as 0, the first hidden layer is numbered as 1, and the like, the output layer is numbered as H+1;

step 102) setting h=h+1, and initializing parameters of the $h^{th}$ layer and the $(h+1)^{th}$ layer;

step 103) inputting an unmarked training sample set $Y=\{x_i^r\}$ into the $h^{th}$ layer, and adjusting a connection weight between the $h^{th}$ layer and the $(h+1)^{th}$ layer and an offset weight of nodes in the $(h+1)^{th}$ layer during minimizing a cost function of the $h^{th}$ layer and the $(h+1)^{th}$ layer;

step 104) judging whether to delete the connection via a probability function of a change of a reconstruction error when there is a connection weight less than a first threshold; if there is a connection weight attenuating to less than the first threshold, the change of the reconstruction error $\Delta E_r$ is obtained by reconstructing samples in two cases that there is a current connection and there is no current connection, and whether to delete the current connection is decided via the probability function of the change of the error $\min[1, \exp(-\Delta E_r/E_r)]$;

step 105) judging whether the forward out-degrees of all the nodes in the $h^{th}$ layer are less than K, if the judging result is yes, proceeding to step 106); otherwise, proceeding to step 103);

step 106) if h>0, judging whether the sum of forward out-degrees of all the nodes in the $h^{th}$ layer is less than the sum of forward out-degrees of all the nodes in the $(h-1)^{th}$ layer, if the judging result is yes, proceeding to step 107); otherwise, proceeding to step 103);

step 107) judging whether a change of the cost function is less than a second threshold, if the judging result is yes, proceeding to step 108); otherwise, proceeding to step 103); and step 108) judging whether h>H is valid, if the judging result is yes, ending the process of the step 1); otherwise, proceeding to step 102).

In the above technical solutions, the step 2) of the method specifically comprises:

inputting an updated training sample into the deep learning model satisfying the K-degree sparse constraint, when the input training sample is an unmarked sample set $Y=\{x_i^r\}$, obtaining an output from the input sample and then reversing it to an input again, performing a reverse reconstruction from the output layer to the input layer under the k-degree constraint, calculating a reconstruction error $E_r$, and adjusting the weight of each layer in a mode of gradient descent or conjugated gradient descent till the error is less than a critical value; when the input training sample is a labelled sample set $X=\{x_i^t, y_i^t\}$, comparing the output with $y_i^t$, calculating a training error $E_t$, and adjusting the forward weight in a mode of gradient descent or conjugated gradient descent till the error is less than a critical value.

The method of the present invention can overcome disadvantages of an existing neural network model such as too slow training speed and difficult parameter optimization, etc., increase the expansion capability, generalization ability and execution speed of the existing neural network models such as a deep feed forward neural network and a deep belief network, etc., and alleviate the difficulty of unsupervised learning and parameter optimization may be alleviated, so that the difficulty in big data processing via a deep learning algorithm may be reduced.

DETAILED DESCRIPTION OF THE INVENTION

First of all, concepts related to the present invention will be explained.

Figure 1:
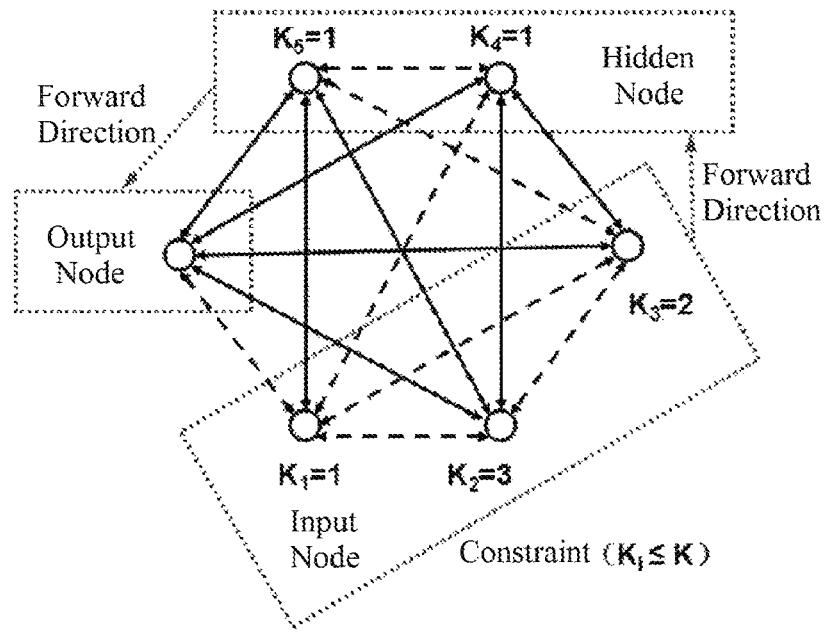
FIG. 1 is a schematic diagram of an unlevelled K-degree sparse network and a node-degree sparse constraint thereof.

As shown in FIG. 1, an unlevelled K-degree sparse network refers to that all the nodes satisfy a node K-degree sparse constraint, and the node K-degree sparse constraint refers to that unnecessary connections between the nodes are deleted till a forward out-degree $K_i$ of all the nodes does not exceed K, wherein K is a set parameter; forward refers to a direction from input to output, and if there is a hidden layer, forward refers to a direction from input to the hidden layer and then to output.

Figure 2:
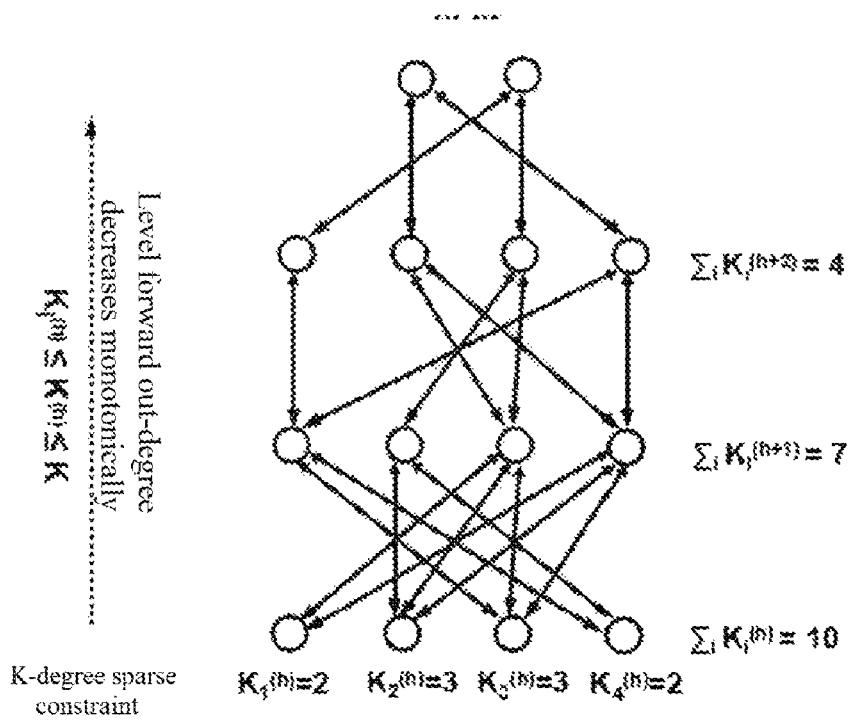
FIG. 2 is a schematic diagram of a levelled K-degree sparse network and a level-degree sparse constraint thereof.

As shown in FIG. 2, a trained levelled K-degree sparse network refers to that all layers satisfy a level k-degree sparse constraint, and the level K-degree sparse constraint refers to that a level forward out-degree of a hidden layer, i.e., a sum of forward out-degrees of the nodes of a single hidden layer, decreases monotonically from input to output. As a special case of the level K-degree sparse constraint, if the forward out-degrees of the nodes on each layer equal to each other, the product of the number of the nodes and the forward out-degree on each layer decreases monotonically from input to output.

Additionally, as some simple variations of the above k-degree sparse network, a node k-degree sparse network refers to a neural network model satisfying $k_i \leq k$, a level K-degree sparse network refers to a neural network model satisfying $\Sigma_i K_i^{(j)} \geq \Sigma_i K_i^{(j+1)}$, and a node upper limit K-degree sparse network refers to a neural network model satisfying $k_i=k$, a level upper limit and an ideal K-degree sparse network refers to a neural network model satisfying $\Sigma_i K_i^{(j)} = \Sigma_i K_i^{(j+1)}$, and an ideal upper limit K-degree sparse network refers to a neural network model satisfying $k_i=k$ and $\Sigma_i K_i^{(j)} = \Sigma_i K_i^{(j+1)}$ simultaneously, to which the method of the present invention can be directly applied.

A neural network model satisfying the K-degree sparse constraint will be described below using mathematical linguistics.

It is assumed that the neural network model has totally N nodes, a network is first formed via full connection, and a weight value of disconnection is zero, as shown in FIG. 1, then an output $x_j$ of any node and an input set $X=\{x_i, i=1 \ldots N\}$ of the node satisfy the operational rule below:

$$x_j = f(\Sigma_i w_{ij} x_i + b_j), \text{ wherein, } x_i \in X, x_j \in X$$

Here, $x_j$ is the output of any node, f is an activation function of the node, $b_j$ is an offset weight of the node, and $w_{ij}$ is an input weight from the connection to the node and a weight with a value of zero is permitted.

Now, it is defined that a forward direction of the whole neural network model is a direction from external input to output, as shown in FIG. 1, for a K-degree sparse network, the output of any node will be forwardly input to $K_i$ nodes:

$$K_i \leq K$$

Here, K is a hyper-parameter, which is usually somewhat smaller than the N of full connection, or even much smaller, to attain a sparse effect; a value taking range of K is (1, N/H], wherein, N is the number of all the nodes in a deep learning model, H is the number of hidden layers of the model, and preferably, the value of K is:

$$K = \left\lfloor \frac{\sqrt{d_{in} d_{out}}}{H} \right\rfloor$$

wherein, $d_{in}$ is a dimensionality of an input of the model, $d_{out}$ is a dimensionality of an output of the model, H is the number of the hidden layers of the model, and $\lfloor \ \rfloor$ is a rounding symbol.

$K_i$ is a forward out-degree of an $i^{th}$ node, wherein i=1 . . . N. If it is a levelled K-degree sparse network, as shown in FIG. 2, it further needs to satisfy the level K-degree sparse constraint:

$$\sum_i K_i^{(j)} \geq \sum_i K_i^{(j+1)}$$

Here, $K_i^{(j)}$ is a forward out-degree of any node in a $j^{th}$ hidden layer, and $K_i^{(j+1)}$ is a forward out-degree of any node in a $(j+1)^{th}$ hidden layer.

For a $h^{th}$ hidden layer, an output of any node will be forwardly input to a $(K_i^{(h)})^{th}$ node, wherein:

$K_i^{(h)} \leq K^{(h)} \leq K$

Wherein, $K^{(h)}$ is a maximum value of the forward out-degree of each node in the $h^{th}$ hidden layer, and for different hidden layers, $K^{(h)}$ may be different, but the value of K keeps constant.

Figure 3:
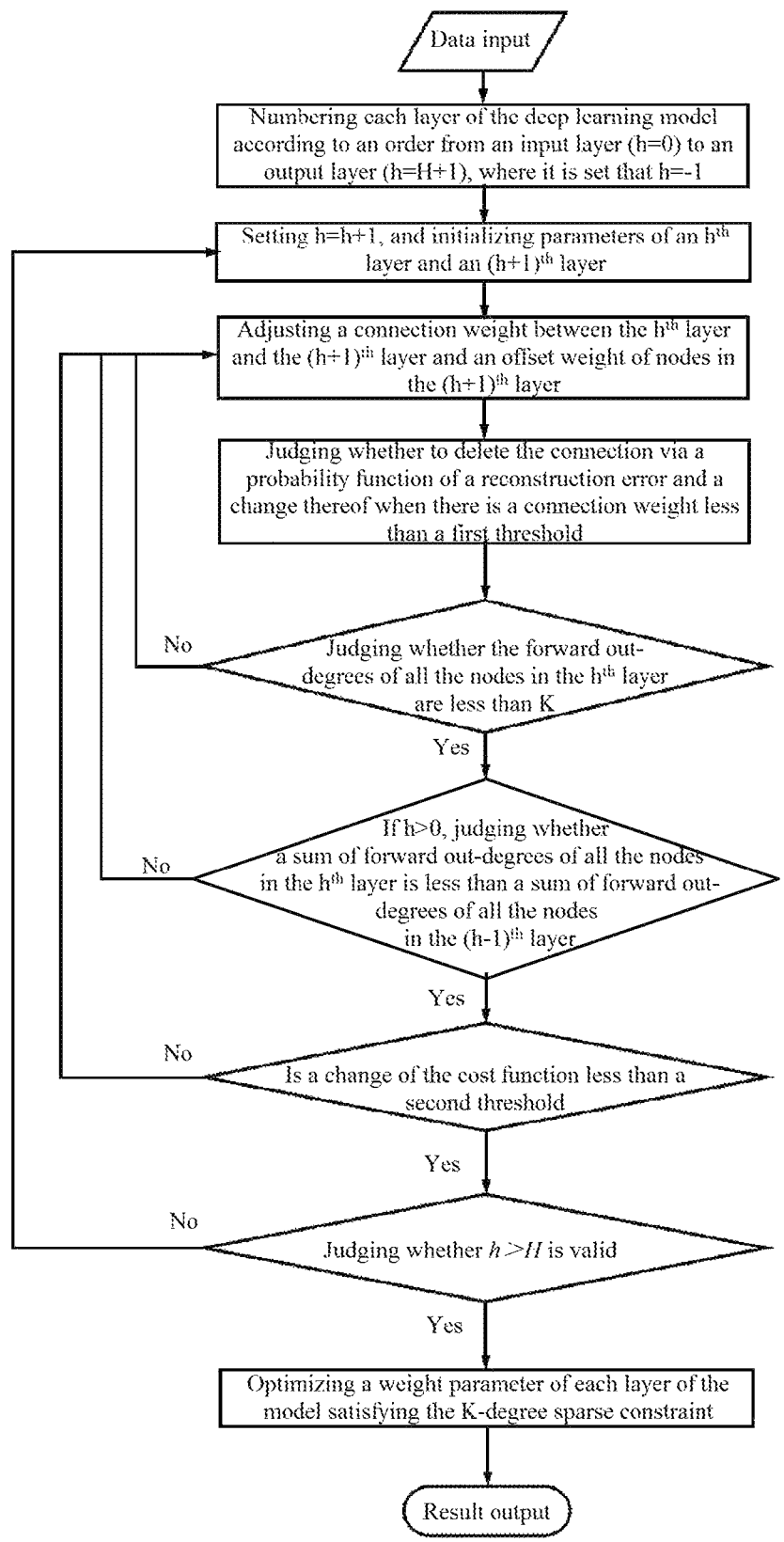
FIG. 3 is a flowchart of a big data processing method based on a deep learning model satisfying degree sparse constraint of the present invention.

As shown in FIG. 3, the present invention provides a big data processing method based on a deep learning model satisfying the K-degree sparse constraint, the method comprises:

step 1) constructing a deep learning model satisfying the K-degree sparse constraint using an unmarked training sample via a gradient pruning method;

the step 1) further comprises:

step 101) numbering each layer of the deep learning model according to an order from an input layer to an output layer, where it is set that h=−1;

it is set that the deep learning model comprises an input layer, H hidden layers and an output layer, i.e., totally H+2 layers from the input layer to the output layer; and it is set that the input layer is numbered as 0, the first hidden layer is numbered as 1, and the like, the output layer is numbered as H+1;

step 102) setting h=h+1, and initializing parameters of an $h^{th}$ layer and an $(h+1)^{th}$ layer;

step 103) inputting an unmarked training sample set $Y=\{x_i^t\}$ into the $h^{th}$ layer, and adjusting a connection weight between the $h^{th}$ layer and the $(h+1)^{th}$ layer and an offset weight of nodes in the $(h+1)^{th}$ layer during minimizing a cost function of the $h^{th}$ layer and the $(h+1)^{th}$ layer;

step 104) judging whether to delete the connection via a probability function of a change of a reconstruction error when there is a connection weight less than a first threshold;

if there is a connection weight attenuating to less than the first threshold, the change of the reconstruction error $\Delta E_r$ is obtained by reconstructing samples in two cases that there is a current connection and there is no current connection, and whether to delete the current connection is decided via the probability function of the change of the error min[1,exp(−$\Delta E_r/E_r$)];

step 105) judging whether the forward out-degrees of all the nodes in the $h^{th}$ layer are less than K, if the judging result is yes, proceeding to step 106); otherwise, proceeding to step 103);

step 106) if h>0, judging whether a sum of forward out-degrees of all the nodes in the $h^{th}$ layer is less than a sum of forward out-degrees of all the nodes in the $(h-1)^{th}$ layer, if the judging result is yes, proceeding to step 107); otherwise, proceeding to step 103);

step 107) judging whether a change of the cost function is less than a second threshold, if the judging result is yes, proceeding to step 108); otherwise, proceeding to step 103);

step 108) judging whether h>H is valid, if the judging result is yes, ending the process of the step 1); otherwise, proceeding to step 102);

step 2) inputting an updated training sample into the deep learning model satisfying the K-degree sparse constraint, and optimizing a weight parameter of each layer of the model, so as to obtain an optimized deep learning model satisfying the K-degree sparse constraint;

An updated training sample is input into the deep learning model satisfying the K-degree sparse constraint, when the input training sample is an unmarked sample set $Y=\{x_i^t\}$, an output is obtained from the input sample and then it is reversed to an input again, and a reverse reconstruction is performed from the output layer to the input layer under the k-degree constraint, a reconstruction error $E_r$ is calculated, and the weight of each layer is adjusted in a mode of gradient descent or conjugated gradient descent till the error is less than a critical value; when the input training sample is a labelled sample set $X=\{x_i^t, y_i^t\}$, the output is compared with $y_i^t$, a training error $E_r$ is calculated, and the forward weight is adjusted in a mode of gradient descent or conjugated gradient descent till the error is less than a critical value.

step 2) inputting an updated training sample into the deep learning model satisfying the K-degree sparse constraint, and optimizing a weight parameter of each layer of the model, so as to obtain an optimized deep learning model satisfying the K-degree sparse constraint;

step 3) inputting big data to be processed into the optimized deep learning model satisfying the K-degree sparse constraint for processing, and finally outputting a processing result.

Finally, it should be noted that the above embodiments are only provided for illustrating but not limiting the technical solutions of the present invention. Although the present invention has been illustrated in detail referring to the embodiments, it will be understood by one of ordinary skills in the art that the technical solutions of the present invention can be modified or equally substituted without departing from the spirit and scope of the technical solutions of the present invention. Therefore, all the modifications and equivalent substitution should fall into the scope of the claims of the present invention.

What is claimed is:

1. A big data processing method based on a deep learning model satisfying a K-degree sparse constraint, comprising:
  step 1) constructing a deep learning model satisfying the K-degree sparse constraint using an unlabeled training sample set via a gradient pruning method;
  wherein
  the K-degree sparse constraint comprises a node K-degree sparse constraint and a level K-degree sparse constraint;
  the node K-degree sparse constraint refers to that forward out-degrees of all nodes in the deep learning model do not exceed K;
  a value range of K is, (1, N/H], wherein N is the number of all the nodes in the deep learning model, and H is the number of hidden layers of the model; and the level K-degree sparse constraint refers to that a sum of forward out-degrees of all nodes in an $h^{th}$ layer is less than a sum of forward out-degrees of all nodes in an $(h-1)^{th}$ layer;

step 2) inputting the unlabeled training sample set or a labeled training sample set into the deep learning model satisfying the K-degree sparse constraint; and optimizing a weight parameter of each layer of the deep learning model, so as to obtain an optimized deep learning model satisfying the K-degree sparse constraint; and step 3) inputting big data to be processed into the optimized deep learning model satisfying the K-degree sparse constraint for processing; and finally outputting a processed result;

wherein, the step 1) further comprises:

step 101) numbering each layer of the deep learning model according to an order from an input layer to an output layer;

wherein h=−1;

the deep learning model comprises an input layer, H hidden layers, and an output layer the deep learning model includes H+2 layers in total; and the input layer is numbered as 0, the first hidden layer is numbered as 1, . . . , the output layer is numbered as H+1;

step 102) setting h=h+1, and initializing parameters of the $h^{th}$ layer and the $(h+1)^{th}$ layer;

step 103) inputting an unlabeled training sample set X into the $h^{th}$ layer; and adjusting a connection weight between the $h^{th}$ layer and the $(h+1)^{th}$ layer and an offset weight of nodes in the $(h+1)^{th}$ layer during minimizing a cost function of the $h^{th}$ layer and the $(h+1)^{th}$ layer;

step 104) determining whether to delete a connection via a probability function of a change of a reconstruction error when there is a connection weight less than a first threshold;

wherein if the connection weight is attenuated to less than the first threshold, the change of the reconstruction error $\Delta E_r$ is obtained by reconstructing samples with or without the current connection, and whether to delete the current connection is determined via the probability function of the change of the error $\min[1, \exp(-\Delta E_r/E_r)]$;

step 105) determining whether the forward out-degrees of all the nodes in the $h^{th}$ layer are less than K;

if yes, proceeding to step 106);

otherwise, returning to step 103);

step 106) if h>0, determining whether the sum of forward out-degrees of all the nodes in the $h^{th}$ layer is less than the sum of forward out-degrees of all the nodes in the $(h-1)^{th}$ layer;

if yes, proceeding to step 107);

otherwise, returning to step 103);

step 107) determining whether a change of the cost function is less than a second threshold;

if yes, proceeding to step 108);

otherwise, returning to step 103); and step 108) determining whether h>H is valid;

if yes, ending the process of the step 1);

otherwise, returning to step 102).

2. The big data processing method based on the deep learning model satisfying the K-degree sparse constraint of claim 1, wherein a value of K is:

$$K = \left\lfloor \frac{\sqrt{d_{in} d_{out}}}{H} \right\rfloor$$

wherein, $d_{in}$ is the number of nodes in the input layer of the model, $d_{out}$ is the number of nodes in the output layer of the model, H is the number of hidden layers of the deep learning model, and $\lfloor \ \rfloor$ is a rounding symbol which rounds to the nearest integer.

3. The big data processing method based on the deep learning model satisfying the K-degree sparse constraint of claim 1, wherein, the step 2) further comprises:

when the input training sample set is an unlabeled sample set X, inputting X into the deep learning model satisfying the K-degree sparse constraint; obtaining an output of the model and then reversing the output to an input again;

performing a reverse reconstruction from the output layer to the input layer under the k-degree constraint;

calculating a reconstruction error $E_r$; and adjusting the weight of each layer in a mode of gradient descent or conjugated gradient descent till the error is less than a critical value.

4. The big data processing method based on the deep learning model satisfying the K-degree sparse constraint of claim 1, wherein the step 2) further comprises:

when the input training sample is a labeled sample set {X, Y}, inputting X into the deep learning model satisfying the K-degree sparse constraint; comparing the output of the model with Y;

calculating a training error $E_r$; and adjusting the forward weight in a mode of gradient descent or conjugated gradient descent till the error is less than a critical value.

5. The big data processing method based on a deep learning model satisfying the K-degree sparse constraint of claim 2, wherein the deep learning model satisfying the K-degree sparse comprises:

a node upper limit K-degree sparse network, a level upper limit K-degree sparse network, and an ideal upper limit K-degree sparse network;

wherein the node upper limit K-degree sparse network refers to that forward out-degrees of all the nodes in the model equal to K;

the level upper limit K-degree sparse network refers to that a sum of forward out-degrees of all the nodes in an $j^{th}$ layer equals to a sum of forward out-degrees of all the nodes in an $(j+1)^{th}$ layer;

j refers to the layer number in the model; and the ideal upper limit K-degree sparse network refers to that forward out-degrees of all the nodes in the model equal to K, and that a sum of forward out-degrees of all the nodes in an $j^{th}$ layer equals to a sum of forward out-degrees of all the nodes in an $(j+1)^{th}$ layer.

* * * * *